(12) United States Patent
Oyama

(10) Patent No.: US 10,951,784 B2
(45) Date of Patent: Mar. 16, 2021

(54) IMAGE FORMING APPARATUS

(71) Applicant: Brother Kogyo Kabushiki Kaisha, Nagoya (JP)

(72) Inventor: Yoshihiro Oyama, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/829,138

(22) Filed: Mar. 25, 2020

(65) Prior Publication Data

US 2020/0314272 A1  Oct. 1, 2020

(30) Foreign Application Priority Data

Apr. 1, 2019  (JP) .............................. JP2019-069841

(51) Int. Cl.
  *H04N 1/00*  (2006.01)
(52) U.S. Cl.
  CPC ..... *H04N 1/00559* (2013.01); *H04N 1/00604* (2013.01); *H04N 2201/0446* (2013.01)
(58) Field of Classification Search
  None
  See application file for complete search history.

(56) References Cited

U.S. PATENT DOCUMENTS

| 5,920,758 A | 7/1999 | Ohtsuki | |
| 6,085,063 A * | 7/2000 | Morita | H04N 1/00631 355/40 |
| 2004/0184855 A1 * | 9/2004 | Hatanaka | G03G 15/6529 399/405 |
| 2007/0140725 A1 * | 6/2007 | Kamimura | G03G 21/1857 399/90 |
| 2011/0158688 A1 * | 6/2011 | Mori | G03G 21/1864 399/119 |
| 2011/0158708 A1 * | 6/2011 | Mori | G03G 15/0812 399/284 |
| 2011/0158709 A1 * | 6/2011 | Mori | G03G 15/0865 399/284 |

(Continued)

FOREIGN PATENT DOCUMENTS

| JP | H11-084797 A | 3/1999 |
| JP | H11-119497 A | 4/1999 |

(Continued)

*Primary Examiner* — Anh-Vinh T Nguyen
(74) *Attorney, Agent, or Firm* — Baker Botts L.L.P.

(57) ABSTRACT

An image forming apparatus includes a printer having a sheet discharge tray, a scanning device disposed above the printer, a resin-made support member supporting the scanning device on the printer and defining a sheet discharge space above the sheet discharge tray between the printer and the scanning device, a metal-made first reinforcement plate fixed to the printer and the support member, and a metal-made second reinforcement plate fixed to the scanning device and the support member. The support member has a notched part formed to communicate the sheet discharge space with an outside in a direction intersecting a sheet discharge direction on the sheet discharge tray. The first reinforcement plate extends at least in a vertical direction along the notched part. The second reinforcement plate, which is not coupled with the first reinforcement plate, extends at least in the vertical direction along the notched part.

9 Claims, 5 Drawing Sheets

(56) References Cited

U.S. PATENT DOCUMENTS

| | | | |
|---|---|---|---|
| 2011/0158710 A1* | 6/2011 | Shiraki | G03G 21/1814 |
| | | | 399/284 |
| 2013/0129379 A1* | 5/2013 | Inoue | G03G 21/1647 |
| | | | 399/107 |
| 2017/0060060 A1* | 3/2017 | Suzuki | G03G 15/235 |
| 2018/0257883 A1* | 9/2018 | Oyama | B65H 3/0653 |
| 2019/0260894 A1* | 8/2019 | Oyama | H04N 1/00103 |

FOREIGN PATENT DOCUMENTS

| | | |
|---|---|---|
| JP | 2001001608 A | 1/2001 |
| JP | 2002-323802 A | 11/2002 |
| JP | 2008-225084 A | 9/2008 |
| JP | 2013-109204 A | 6/2013 |

\* cited by examiner

IMAGE FORMING APPARATUS

CROSS-REFERENCE TO RELATED APPLICATION

This application is based upon and claims the benefit of priority from prior Japanese patent application No. 2019-069841, filed on Apr. 1, 2019, the entire contents of which are incorporated herein by reference.

TECHNICAL FIELD

The present disclosure relates to an image forming apparatus.

BACKGROUND

An image forming apparatus of the so-called internal sheet-discharge type, which has a scanning device provided at an upper part of a printer, is known. In the image forming apparatus or the like, the scanning device is supported by a support member made of resin.

In recent years, in the internal sheet-discharge type image forming apparatus, a configuration in which a part of the support member configured to support the scanning device is notched so as to easily take out a sheet internally discharged is adopted.

When a part of the support member is notched, a support area for the scanning device is reduced, so that coupling strength between the scanning device and the printer is lowered. For this reason, when the image forming apparatus is dropped upon transportation, for example, the scanning device is likely to be deformed due to shock. As a result, a document plate formed of glass or the like of the scanning device may be damaged.

SUMMARY

An object of the present disclosure is to provide an image forming apparatus of an internal sheet-discharge type, which enables to suppress a scanning device from being damaged due to shock.

An aspect of the present disclosure is an image forming apparatus (1) including a printer (2) having a sheet discharge tray (21) provided at an upper part of the printer (2), a scanning device (3) disposed above the printer (2), and a support member (5) configured to support the scanning device (3) on the printer (2), and define a sheet discharge space (S) above the sheet discharge tray (21) between the printer (2) and the scanning device (3), in which the support member (5) is made of resin.

The image forming apparatus (1) includes a first reinforcement plate (6) fixed to the printer (2) and the support member (5), and a second reinforcement plate (7) fixed to the scanning device (3) and the support member (5), in which the first reinforcement plate (6) and the second reinforcement plate (7) are made of metal.

The support member (5) has a notched part (51) formed to communicate the sheet discharge space (S) with an outside in a direction intersecting a sheet discharge direction on the sheet discharge tray (21). The first reinforcement plate (6) extends at least in a vertical direction along the notched part (51). The second reinforcement plate (7), which is not coupled with the first reinforcement plate (6), extends at least in the vertical direction along the notched part (51).

According to the configuration, since the notched part (51) of the support member (5) is reinforced by the first reinforcement plate (6) and the second reinforcement plate (7), it is possible to increase the coupling strength between the scanning device (3) and the printer (2).

The first reinforcement plate (6) and the second reinforcement plate (7) may be disposed with being spaced each other. According to the configuration, when shock is applied to the image forming apparatus (1), the reinforcement plates do not interfere with each other, so that it is possible to absorb the shock by the support member (5) made of resin. As a result, it is possible to suppress the scanning plate (31) from being damaged, i.e., the scanning device (3) from being damaged due to the shock.

In the meantime, the reference signs in the parentheses of the respective means indicate exemplary correspondence relations with the specific means and the like described in the embodiment, and the present disclosure is not limited to the specific means and the like denoted with the reference signs in the parentheses of the respective means and the like.

DETAILED DESCRIPTION

"Mode for carrying out the present disclosure" described below provides an embodiment by way of example. That is, subject matters and the like of the invention defined in the claims are not limited to the specific means, structures and the like described in the embodiment.

Arrows and the like indicative of directions in the respective drawings showing the present embodiment are provided so as to easily understand the mutual relation of the respective drawings. The present disclosure is not limited to the directions shown in the respective drawings.

At least one member or part is provided for those denoted at least by reference signs, unless otherwise specified, for example, as "plurality", "two or more" and the like. Hereinbelow, the embodiment of the present disclosure will be described with reference to the drawings.

1. First Embodiment

[1-1. Configuration]

Figure 1:
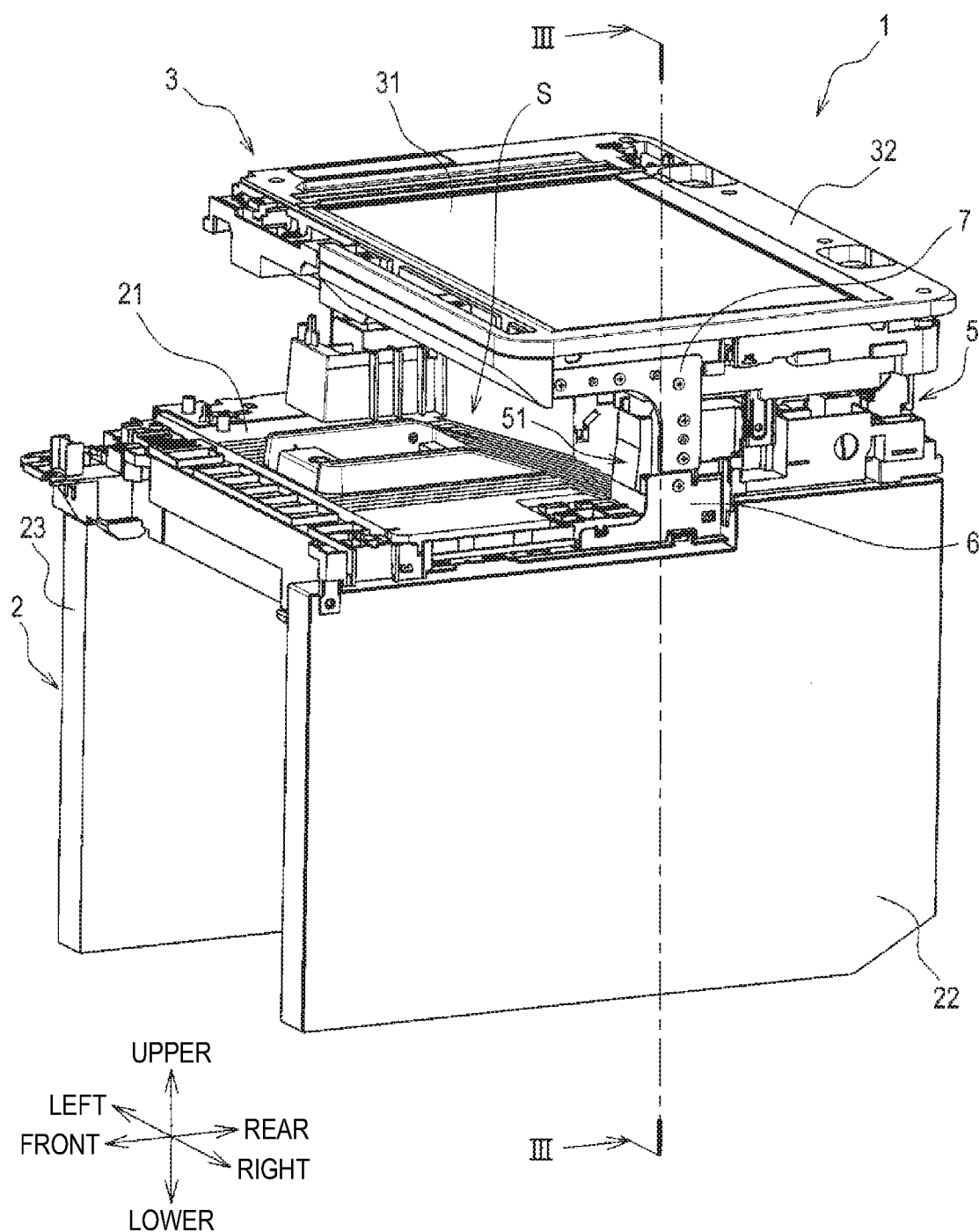
FIG. 1 is a pictorial perspective view of an image forming apparatus in accordance with an embodiment.

An image forming apparatus 1 shown in FIG. 1 includes a printer 2, a scanning device 3, a support member 5, a first reinforcement plate 6, and a second reinforcement plate 7.

<Printer>

The printer 2 is a device which forms an image on a sheet. The printer 2 includes a sheet discharge tray 21, a first frame 22, a second frame 23, and an image forming unit (not shown). In FIG. 1, only the sheet discharge tray 21 and the frames 22 and 23 of the printer 2 are shown.

The sheet discharge tray 21 has a placement surface on which a sheet having an image formed thereon by the image forming unit is to be discharged. The sheet discharge tray 21 is provided above the printer 2. Specifically, the sheet discharge tray 21 is disposed on the two frames 22 and 23.

Each of the first frame 22 and the second frame 23 is a plate-shaped member having a plate surface perpendicular to the placement surface of the sheet discharge tray 21. The first frame 22 and the second frame 23 are disposed with being spaced in a right and left direction of the image forming apparatus 1 (i.e., a direction perpendicular to the plate surface). The first frame 22 and the second frame 23 define a space in which the image forming unit and the like are accommodated.

Figure 2:
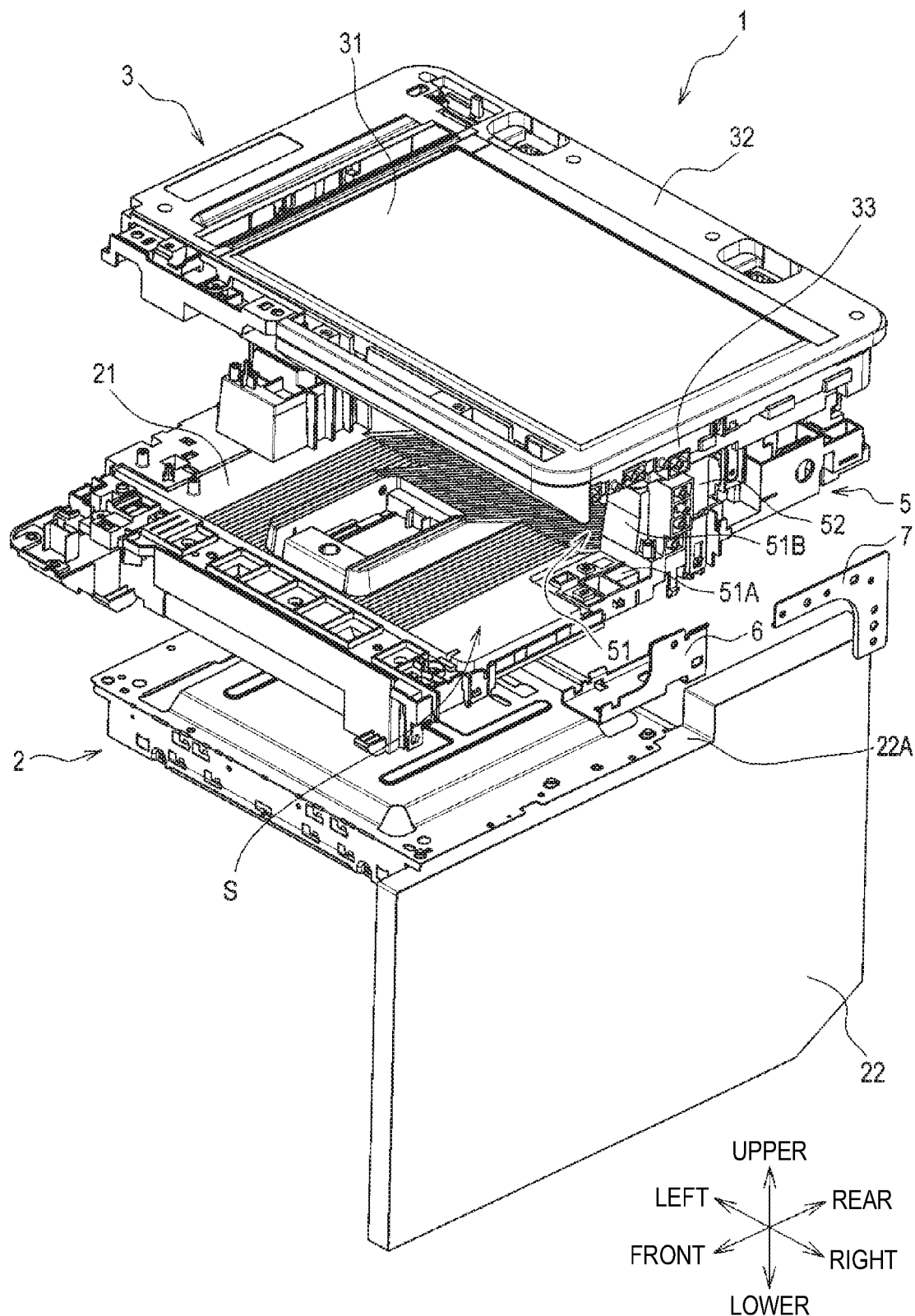
FIG. 2 is a pictorial exploded perspective view of the image forming apparatus shown in FIG. 1.

The first frame 22 is disposed on a right side of the printer 2, and has an upper surface 22A (refer to FIG. 2) perpendicular to a vertical direction. On the upper surface 22A, the support member 5 and the first reinforcement plate 6, which will be described later, are fixed, in addition to the sheet discharge tray 21.

<Scanning Device>

The scanning device 3 is a device which reads an image printed on a document. The scanning device 3 is disposed above the printer 2. The scanning device 3 has a document plate 31 and a frame body 32.

The document plate 31 is a plate on which a document is placed, and has light-transmissivity. The document plate 31 is, for example, formed of glass. The document plate 31 is disposed so that a reading surface of the document plate 31 is parallel to a horizontal direction.

The frame body 32 is a member for holding the document plate 31. The frame body 32 has a second side surface 33 (refer to FIG. 2) extending in the vertical direction. The second side surface 33 is a surface parallel to a sheet discharge direction (i.e., a front and rear direction) on the sheet discharge tray 21.

<Support Member>

The support member 5 is a member made of resin and supports the scanning device 3 on the printer 2. The support member 5 defines the sheet discharge space S above the sheet discharge tray 21 between the printer 2 and the scanning device 3.

The support member 5 is disposed on a side (i.e., an outer side in a direction perpendicular to the sheet discharge direction) of the sheet discharge tray 21 along the sheet discharge direction on the sheet discharge tray 21. The support member 5 has a notched part 51, and a first side surface 52 (refer to FIG. 2).

The support member 5 of the present embodiment and the sheet discharge tray 21 are formed as a single-piece. That is, the support member 5 is formed integrally with the sheet discharge tray 21 by resin. As the resin for forming the support member 5 and the sheet discharge tray 21, ABS resin is used, for example. Also, the support member 5 is coupled to the scanning device 3 by screws, for example.

The notched part 51 is formed to communicate the sheet discharge space S with an outside in a direction intersecting the sheet discharge direction on the sheet discharge tray 21. In the present embodiment, the notched part 51 has such a shape that a front end portion of the support member 5 is recessed rearward (i.e., an opposite direction to the sheet discharge direction).

Specifically, the notched part 51 has a first surface 51A extending in the front and rear direction and a second surface 51B extending in the vertical direction. The first surface 51A is disposed to face the scanning device 3.

The first side surface 52 extends in the vertical direction. The first side surface 52 is a surface parallel to the sheet discharge direction (i.e., the front and rear direction) on the sheet discharge tray 21. That is, the first side surface 52 is parallel to the second side surface 33 of the scanning device 3.

<First Reinforcement Plate>

The first reinforcement plate 6 is a plate made of metal and fixed to the printer 2 and the support member 5. The first reinforcement plate 6 extends at least in the vertical direction along the notched part 51.

Figure 3:
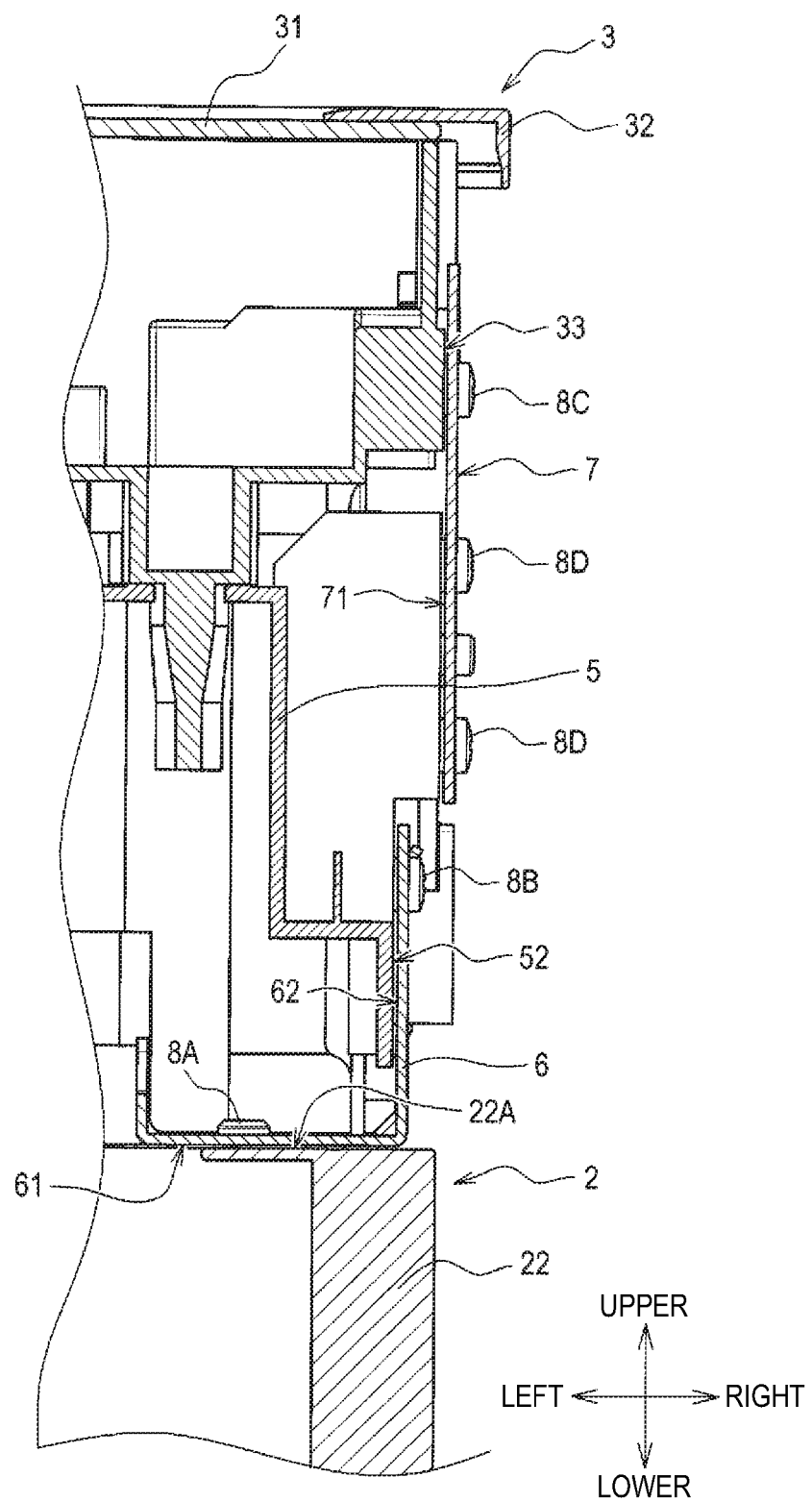
FIG. 3 is a pictorial partially sectional view taken along a line of FIG. 1.

As shown in FIG. 3, the first reinforcement plate 6 has a first fixed surface 61 fixed to the upper surface 22A of the first frame 22, and a second fixed surface 62 intersecting the first fixed surface 61 and fixed to the first side surface 52 along the first side surface 52 of the support member 5.

Figure 4A:
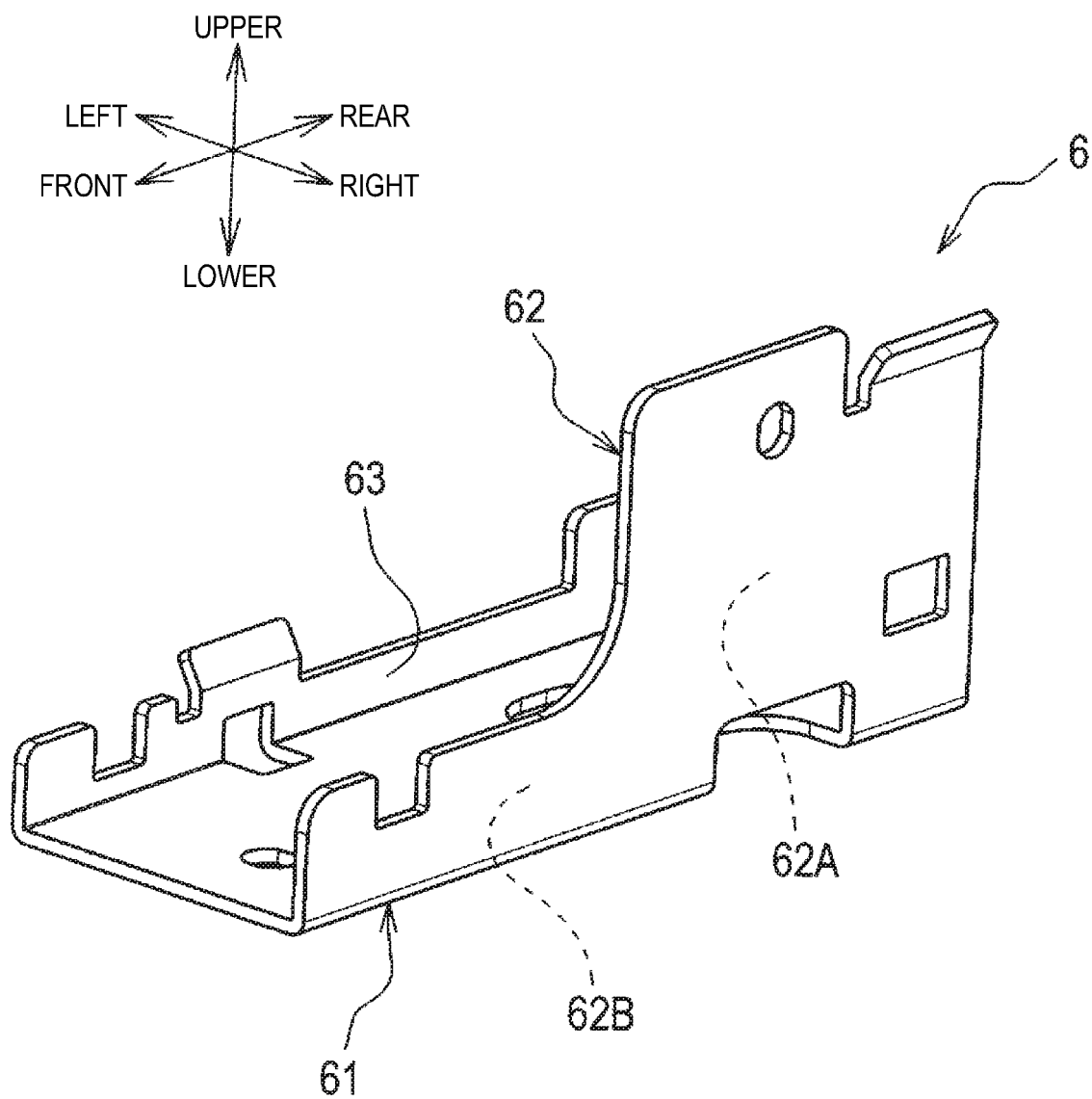
FIG. 4A is a pictorial perspective view of a first reinforcement plate of the image forming apparatus shown in FIG. 1.

The first fixed surface 61 is a surface perpendicular to the vertical direction. The second fixed surface 62 is a surface extending upward from an outer side of the first fixed surface 61 with respect to the right and left direction and perpendicular to the right and left direction. As shown in FIG. 4A, the second fixed surface 62 has a first part 62A extending in the vertical direction along the notched part 51 (specifically, the second surface 51B) and a second part 62B provided in front of the first part 62A and having a height less than the first part 62A in the vertical direction.

As shown in FIG. 3, the first fixed surface 61 is fastened to the upper surface 22A of the first frame 22 by at least one screw 8A. The second fixed surface 62 is fastened to the first side surface 52 of the support member 5 by at least one screw 8B.

<Second Reinforcement Plate>

The second reinforcement plate 7 is a plate made of metal and fixed to the scanning device 3 and the support member 5. The second reinforcement plate 7 extends at least in the vertical direction along the notched part 51. The second reinforcement plate 7 is disposed with being spaced from the first reinforcement plate 6. That is, the second reinforcement plate 7 is not directly coupled with or bonded to the first reinforcement plate 6.

As shown in FIG. 3, the second reinforcement plate 7 has a third fixed surface 71 fixed to the second side surface 33 along the second side surface 33 of the scanning device 3. The third fixed surface 71 is a surface perpendicular to the right and left direction and is parallel to the second fixed surface 62 of the first reinforcement plate 6. The third fixed surface 71 is also fixed to the first side surface 52 along the first side surface 52 of the support member 5.

The third fixed surface 71 is disposed in a position in which the third fixed surface 71 does not overlap the document plate 31 in the vertical direction. That is, the third fixed surface 71 is disposed outside of an end portion of the document plate 31 in the right and left direction.

Also, a part including the second fixed surface 62 of the first reinforcement plate 6 is disposed with being offset with respect to a part including the third fixed surface 71 of the second reinforcement plate 7 in a direction (i.e., the right and left direction) perpendicular to the second fixed surface 62. Specifically, the second fixed surface 62 is disposed inside of the third fixed surface 71. However, the second fixed surface 62 may be disposed outside of the third fixed surface 71.

Figure 4B:
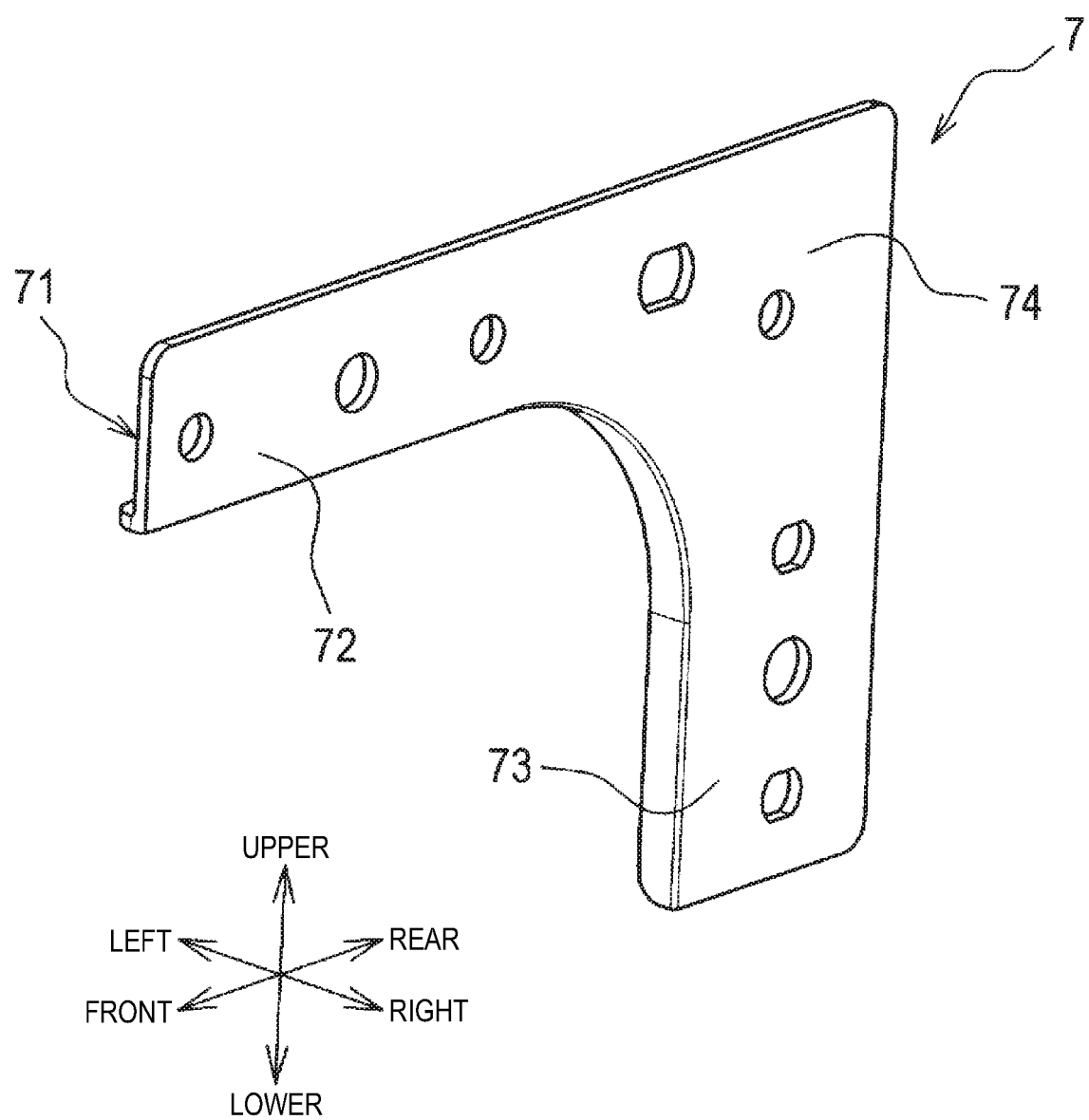
FIG. 4B is a pictorial perspective view of a second reinforcement plate of the image forming apparatus shown in FIG. 1.

As shown in FIG. 4B, the second reinforcement plate 7 has an L-shape when viewed from the direction (i.e., the right and left direction of the image forming apparatus 1) intersecting the sheet discharge direction, and has a first end portion 72, a second end portion 73 and a bent portion 74 coupling the first end portion 72 and the second end portion 73.

The first end portion 72 and the bent portion 74 are fastened to the scanning device 3 by at least one screw 8C (refer to FIG. 3). The second end portion 73 is fastened to the support member 5 by at least one screw 8D (refer to FIG. 3).

[1-2. Effects]

According to the embodiment as described above, following effects are obtained.

(1a) Since the notched part 51 of the support member 5 is reinforced by the first reinforcement plate 6 and the second reinforcement plate 7, it is possible to increase the coupling strength between the scanning device 3 and the printer 2.

(1b) Since the first reinforcement plate 6 and the second reinforcement plate 7 are spaced from each other, when shock is applied to the image forming apparatus 1, the reinforcement plates do not interfere with each other, so that the shock can be absorbed by the support member 5 made of resin. As a result, it is possible to suppress the document plate 31 from being damaged, i.e., the scanning device 3 from being damaged due to the shock.

(1c) The first reinforcement plate 6 has the first fixed surface 61 and the second fixed surface 62, so that it is possible to transmit load in the vertical direction from the second fixed surface 62 to the first frame 22. As a result, it is possible to increase the support strength for the scanning device 3.

(1d) The second reinforcement plate 7 has the third fixed surface 71 fixed along the second side surface 33 of the scanning device 3, so that it is possible to increase the strength of the notched part 51 against the load in the vertical direction.

(1e) The part including the second fixed surface 62 of the first reinforcement plate 6 and the part including the third fixed surface 71 of the second reinforcement plate 7 are disposed with being offset in the direction perpendicular to the second fixed surface 62, so that when the load in the vertical direction is applied to the support member 5, the reinforcement plates can be suppressed from interfering with each other.

(1f) The third fixed surface 71 of the second reinforcement plate 7 is disposed in the position in which the third fixed surface 71 does not overlap the document plate 31 in the vertical direction, so that the load of the notched part 51 in the vertical direction is difficult to be directly transmitted to the document plate 31. As a result, it is possible to more effectively suppress the document plate 31 from being damaged.

(1g) The first fixed surface 61 is fastened to the upper surface 22A of the first frame 22, so that it is possible to increase the operation efficiency of attaching the first reinforcement plate 6 and the coupling strength between the first reinforcement plate 6 and the printer 2.

(1h) Since the sheet discharge tray 21 and the support member 5 are formed as a single-piece, the support member 5 becomes a part of a component having a three-dimensional structure. For this reason, the support member 5 is suppressed from being deformed, and the strength of the notched part 51 is improved.

(1i) The first end portion 72 and the bent portion 74 of the second reinforcement plate 7 having an L-shape are fastened to the scanning device 3 and the second end portion 73 is fastened to the support member 5, so that it is possible to increase the strength of the notched part 51 against the shock from above.

2. Other Embodiments

Although the embodiment of the present disclosure has been described, the present disclosure is not limited to the embodiment and can take diverse forms.

(2a) In the image forming apparatus 1 of the embodiment, the first reinforcement plate 6 and the second reinforcement plate 7 may be respectively fixed to the printer 2, the scanning device 3 and the support member 5 by a means other than the screw.

(2b) In the image forming apparatus 1 of the embodiment, the first reinforcement plate 6 is not necessarily required to have the first fixed surface 61. That is, the first reinforcement plate 6 may be fixed to a side surface of the printer 2. Also, the second reinforcement plate 7 is not necessarily required to have the L-shape.

(2c) In the image forming apparatus 1 of the embodiment, the part including the second fixed surface 62 of the first reinforcement plate 6 is not necessarily required to be disposed with being offset with respect to the part including the third fixed surface 71 of the second reinforcement plate 7 in the direction perpendicular to the second fixed surface 62 inasmuch as the parts are spaced in the upper and lower direction.

Also, the part including the second fixed surface 62 of the first reinforcement plate 6 may be disposed with overlapping the part including the third fixed surface 71 of the second reinforcement plate 7 in the direction perpendicular to the second fixed surface 62 inasmuch as the parts are spaced in the corresponding direction.

(2d) In the image forming apparatus 1 of the embodiment, the third fixed surface 71 of the second reinforcement plate 7 may be disposed in a position in which the third fixed surface 71 overlaps the document plate 31 in the vertical direction. That is, the second reinforcement plate 7 may be disposed inside of the end portion of the document plate 31.

(2e) In the image forming apparatus 1 of the embodiment, the sheet discharge tray 21 and the support member 5 are not necessarily required to be integrally formed. That is, the support member 5 formed separately from the sheet discharge tray 21 may be fixed to the sheet discharge tray 21 by a screw or the like.

(2f) A function of one constitutional element in the embodiment may be distributed to a plurality of constitutional elements, or functions of a plurality of constitutional elements may be integrated into one constitutional element. Also, a part of the configuration in the embodiment may be omitted. Also, at least a part of the configuration in the embodiment may be added to or replaced with another configuration in the embodiment. In the meantime, all aspects included in the technical spirits specified by the claims are embodiments of the present disclosure.

What is claimed is:

1. An image forming apparatus comprising:
    a printer having a sheet discharge tray provided at an upper part of the printer;
    a scanning device disposed above the printer;
    a support member configured to support the scanning device on the printer, and define a sheet discharge space above the sheet discharge tray between the printer and the scanning device, the support member being made of resin;
    a first reinforcement plate fixed to the printer and the support member, the first reinforcement plate being made of metal; and
    a second reinforcement plate fixed to the scanning device and the support member, the second reinforcement plate being made of metal,
    wherein the support member has a notched part formed to communicate the sheet discharge space with an outside in a direction intersecting a sheet discharge direction on the sheet discharge tray, the first reinforcement plate extends at least in a vertical direction along the notched part, and the second reinforcement plate, which is not coupled with the first reinforcement plate, extends at least in the vertical direction along the notched part.

2. The image forming apparatus according to claim 1, wherein the second reinforcement plate is disposed with being spaced from the first reinforcement plate.

3. The image forming apparatus according to claim 1, wherein the printer has a plate-shaped frame having an upper surface, the support member has a first side surface extending in the vertical direction, and the first reinforcement plate has:
- a first fixed surface fixed to the upper surface of the frame; and
- a second fixed surface intersecting the first fixed surface, and fixed to the first side surface along the first side surface.

4. The image forming apparatus according to claim 3, wherein the scanning device has a second side surface extending in the vertical direction, and the second reinforcement plate has a third fixed surface fixed to the second side surface along the second side surface.

5. The image forming apparatus according to claim 4, wherein a part including the second fixed surface of the first reinforcement plate is disposed with being offset with respect to a part including the third fixed surface of the second reinforcement plate in a direction perpendicular to the second fixed surface.

6. The image forming apparatus according to claim 4, wherein the scanning device having a light-transmissive document plate on which a document is placed, and the third fixed surface of the second reinforcement plate is disposed in a position in which the third fixed surface does not overlap the document plate in the vertical direction.

7. The image forming apparatus according to claim 3, wherein the first fixed surface is fastened to the upper surface of the frame by a screw.

8. The image forming apparatus according to claim 1, wherein the sheet discharge tray and the support member are formed as a single-piece.

9. The image forming apparatus according to claim 1, wherein the second reinforcement plate has an L-shape when viewed from the direction intersecting the sheet discharge direction, and having a first end portion, a second end portion and a bent portion coupling the first end portion and the second end portion, the first end portion and the bent portion are fastened to the scanning device by a screw, and the second end portion is fastened to the support member by a screw.

* * * * *

UNITED STATES PATENT AND TRADEMARK OFFICE
CERTIFICATE OF CORRECTION

PATENT NO. : 10,951,784 B2
APPLICATION NO. : 16/829138
DATED : March 16, 2021
INVENTOR(S) : Yoshihiro Oyama Page 1 of 1

It is certified that error appears in the above-identified patent and that said Letters Patent is hereby corrected as shown below:

In the Claims

Claim 6, Column 8, Line 5, please change "device having a" to --device has a--.

Claim 9, Column 8, Line 20, please change "device having a" to --device has a--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*